G. W. INGERSOLL & H. L. FISHER.
WEANING BIT FOR ANIMALS.
No. 180,885. Patented Aug. 8, 1876.
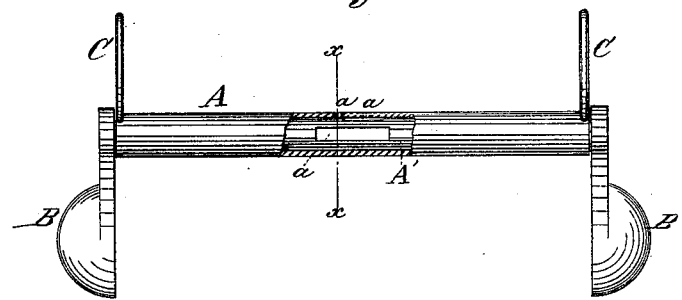
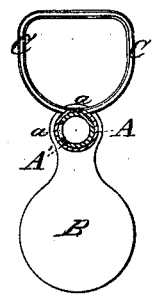
WITNESSES:
H. Rydquist.
John Goethals
INVENTOR:
G. W. Ingersoll
H. L. Fisher
BY
ATTORNEYS.

UNITED STATES PATENT OFFICE.

GEORGE W. INGERSOLL AND HARVEY L. FISHER, OF TOLEDO, IOWA, ASSIGNORS TO JACOB L. NEFF AND HENRY GIEBERT, OF SAME PLACE.

IMPROVEMENT IN WEANING-BITS FOR ANIMALS.

Specification forming part of Letters Patent No. 180,885, dated August 8, 1876; application filed May 16, 1876.

*To all whom it may concern:*

Be it known that we, GEORGE W. INGERSOLL and HARVEY L. FISHER, of Toledo, county of Tama and State of Iowa, have invented a new and Improved Anti-Suction Bit, of which the following is a specification:

In the accompanying drawing, Figure 1 represents a front view of our anti-sucking bit for calves, with a part broken out to show interior revolving tube, and Fig. 2 is a vertical transverse section of the same on line $x\,x$, Fig. 1.

Similar letters of reference indicate corresponding parts.

The invention relates to an improved weaning or anti-suction bit for calves, by which the animal is prevented from sucking, and no incumbrance caused to the same in eating and drinking.

The air-holes are not liable to get clogged, so as to exclude the air and supply the air at every attempt at sucking, thereby preventing it and weaning the animal.

The invention consists of an outer hollow tube with air-holes at the central part, and open ends and an interior revolving tube with central air-holes and open-weighted ends.

In the drawing, A represents the outer, and A' the inner, tube of our anti-suction bit, which are both open at the ends to let in the air. The outer tube A is attached by loops C and straps to the head, while the inner tube A' is provided with ball-shaped weights or ears B that retain a perpendicular position at every motion of the animal's head, and revolve thereby the inner tube within the outer tube. Both the outer and inner tubes A A' are arranged with holes or slots $a$ near the center of the tubes, which holes are so disposed as to let the air into the animal's mouth, and thus prevent sucking whenever the animal holds its head up into a position for sucking, the weighted interior tube assuming then such a position in the outer tube that the holes coincide and supply the air. When the animal holds its head in downward position for eating and drinking, the inner tube is turned by the weights, and the air-supply interrupted as the connection of holes of the inner and outer tubes is discontinued.

This automatic interruption of the air-supply of the bit forms the main feature of our invention, as thereby not the slightest inconvenience to the animal in drinking is produced, and the same is not compelled to put its whole nose into the water to exclude the air, which forms a serious objection to the bits at present in use.

The friction of the inner and outer tubes prevents the clogging of the air-holes, and secures, in connection with the weighted tube, the reliable working of the bit, namely, the opening of the air-supply holes to prevent sucking, and the closing of the same during eating and drinking.

Having thus described our invention, we claim as new and desire to secure by Letters Patent—

1. In a weaning or anti-sucking bit, the combination of the outer tube A and inner rotary tube A', both open at their ends, and each provided with central openings, and adapted by the rotation of the latter to admit the air when the animal attempts to suck, but excluding the air when eating or drinking, all substantially as set forth.

2. The combination of the outer fixed tube with an inner tube, adapted to be rotated or turned by means of the weighted ends, all substantially as shown and described.

GEORGE W. INGERSOLL.
HARVEY L. FISHER.

Witnesses:
J. E. FRICK,
JOHN W. YOUNGMAN.